May 5, 1925. 1,536,968
P. W. PALM
WIND MOTOR
Filed June 12, 1924 3 Sheets-Sheet 2
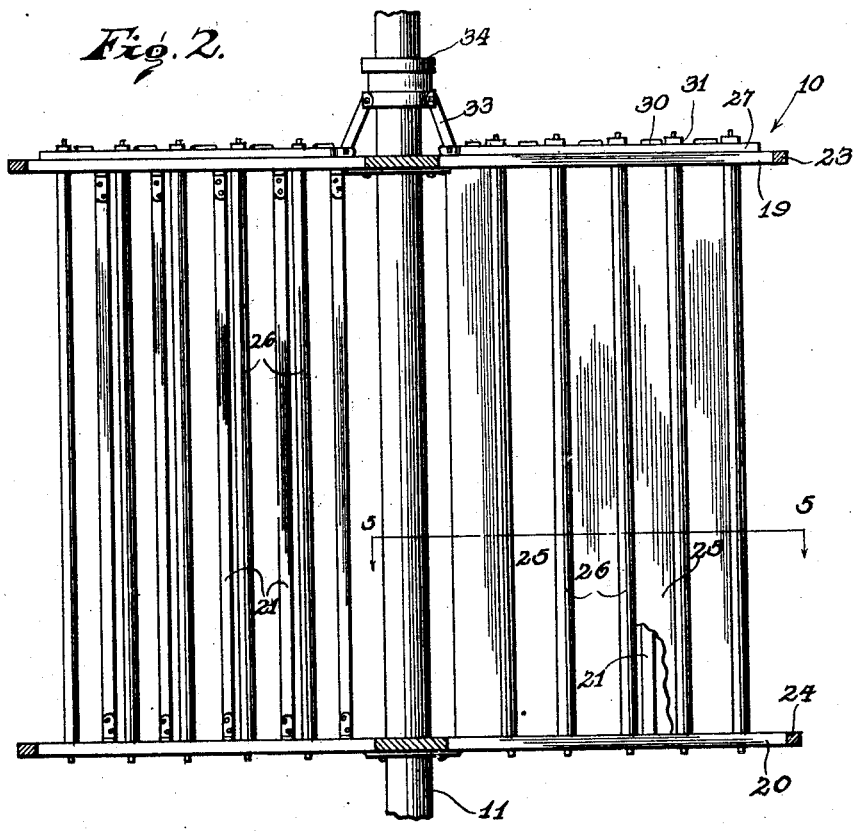
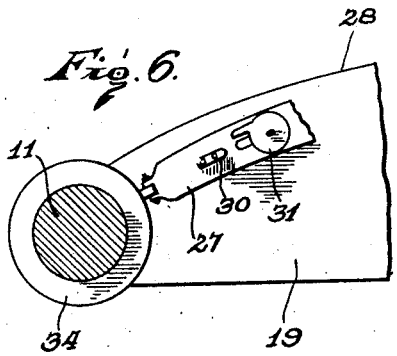
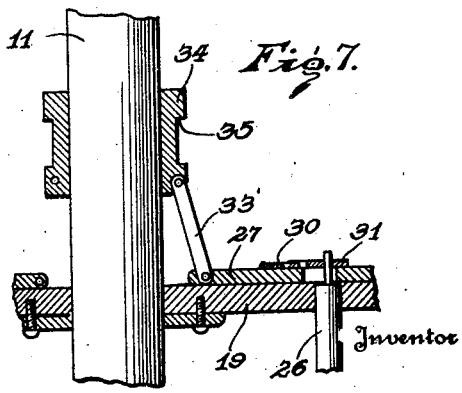
Inventor
P. W. Palm.
By
Attorney

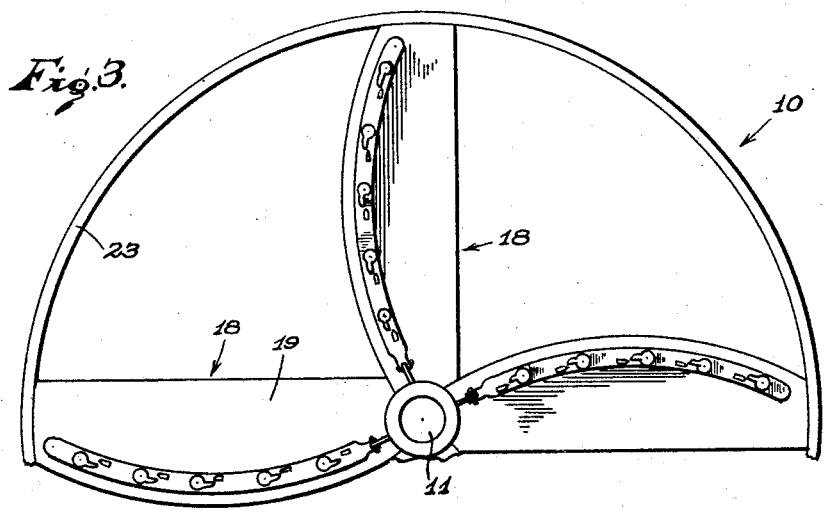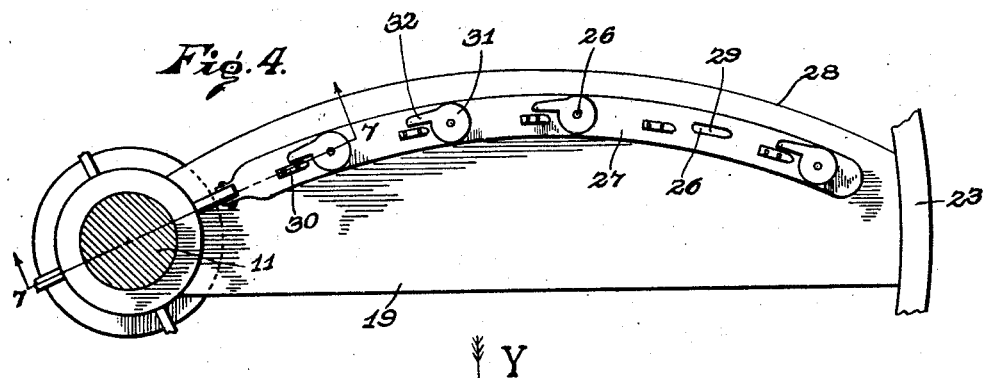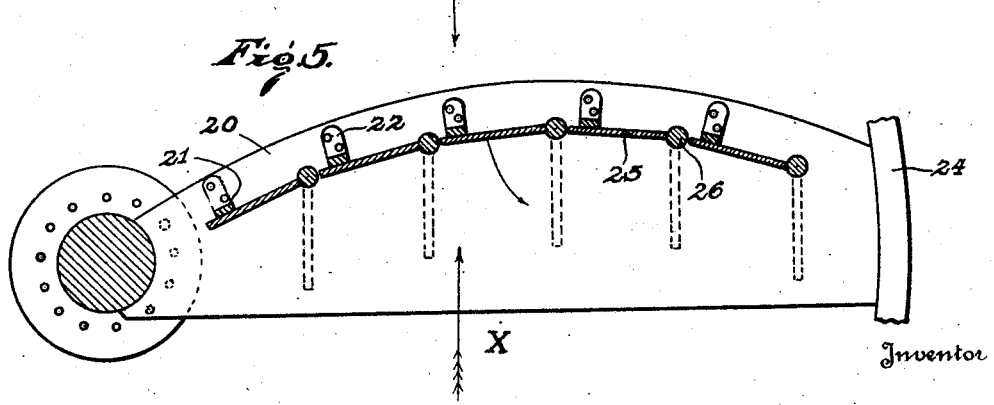

Patented May 5, 1925.

1,536,968

UNITED STATES PATENT OFFICE.

PER W. PALM, OF BAUDETTE, MINNESOTA.

WIND MOTOR.

Application filed June 12, 1924. Serial No. 719,593.

*To all whom it may concern:*

Be it known that I, PER W. PALM, a citizen of the United States, residing at Baudette, in the county of Lake of the Woods and State of Minnesota, have invented certain new and useful Improvements in Wind Motors, of which the following is a specification.

The present invention relates to a wind motor and one object of the same is to erect such a motor in a fixed position so that it will catch the full force of the wind independent of the direction in which the wind is blowing. The motor can be built in almost any size from the smallest to the largest and is provided with means to stop the same even when the wind is running high.

The main feature of this wind motor is that it consists of a plurality of radially disposed wings preferably mounted upon an upright shaft so as to revolve the same and each wing is composed of a plurality of blades which automatically set themselves to receive the full force of the wind on the acting side while the blades are presented edgewise against the wind on the non-acting or returning side.

In the accompanying drawings, one embodiment of the invention is illustrated, and Figure 1 presents a front elevation illustrating the general arrangement of a wind motor as erected in a supporting structure;

Fig. 2 is a similar view, partly in section, of the wings of a motor;

Fig. 3 is a fragmentary top plan view of the motor showing the position of the wings;

Fig. 4 is a similar view to Fig. 3 on a larger scale showing one of the wings;

Fig. 5 is a horizontal section on the line 5—5 of Fig. 2;

Fig. 6 is a fragmentary top plan view of one of the wings similar to Fig. 4 showing the parts in a different position, and Fig. 7 is a vertical section on the line 7—7 of Fig. 4.

Figure 1:
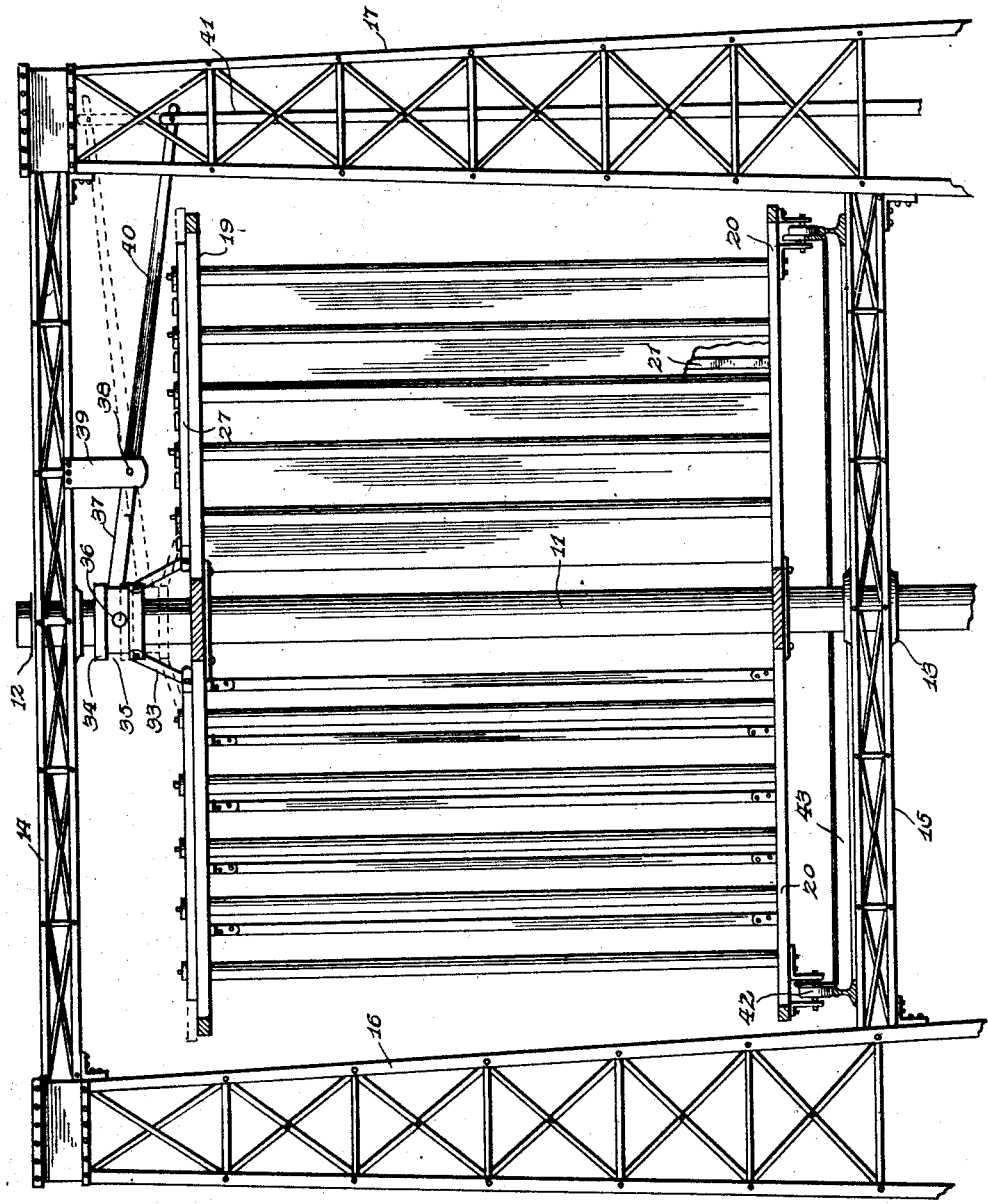

In the drawings, reference numeral 10 represents the main part of the wind motor which may be properly called the rotor. The rotor is secured on a vertical shaft 11 carried in suitable bearings 12 and 13 in the top and bottom cross beams 14 and 15, respectively, supported between two or more structural turrets 16 and 17, as best seen in Fig. 1.

The rotor is composed of a plurality of wings 18, four being shown in the drawings. These wings consist of an upper arm 19 and a lower arm 20 spaced a suitable distance apart. When four arms are used, they are situated circumferentially ninety degrees apart, as seen in the drawings. These arms are firmly connected with the shaft 11. Each arm has a curved forward edge 28 and a straight rearward edge for the purpose that will be more fully described later on. Between the arms are inserted a plurality of connecting rods 21 which, as shown in the drawings, consist of band iron bent at the top and bottom to form feet 22 which are rigidly secured to the respective arms 19 and 20, see Fig. 5. The outer ends of the upper arms are connected by a ring 23 and the ends of the lower arms are similarly connected by another ring 24, the upper and lower arms with these rings thus forming a wheel-like structure. Instead of making the rings circular, the ends of the arms may be connected by straight rods if so desired.

The wing proper consists of a plurality of blades 25 mounted on spindles 26 which are carried in the top and bottom arms 19 and 10 so as to permit the swinging of the blades around the axes of the spindles, see Fig. 5. The spindles are spaced apart the same distance as the connecting rods 21 but some distance to one side thereof and the width of each blade corresponds to the distance between the spindles so that, when the blades stand in actuating position, as seen in Fig. 5, they form practically a solid wall from end to end of the corresponding arms of the wing. The arrangement is made so that, when the blades are so situated, the inner ends of the blades abut against the corresponding connecting rod 21 and is supported thereby so that they cannot swing further in clockwise direction, as seen in said figure, but are free to swing in the opposite direction. In this manner, if the wind blows in the direction indicated by the arrow X in Fig. 5, the blades automatically close to form a complete wing to receive the full blast of the wind, while, on the other hand, if the wind blows in the opposite direction, as indicated by the arrow Y, the blades automatically open and stand in the direction parallel to the wind current so as to give practically no resistance against the same. This is indicated by dotted lines in the same figure.

In Fig. 4 is shown the stopping and starting device for the wind motor. This consists of a slide 27 running parallel with the curved edge 28 of the upper arm 19. One of these slides 27 is provided for each of the upper arms 19, as indicated in Fig. 3, and each slide has a longitudinal slot 29 for each of the spindles 26 which project upwardly through the arms and engage in these slots. In this manner the spindles form guides for the slides 27. A plurality of abutments 30 are shown on top of each slide in the direction of the spindles 26 and each of the latter carries a cap 31 situated above the slide 27. Each cap has a radially projecting nose 32 which is adapted to engage with the corresponding abutment 30 when the slide stands in the locked position seen in Fig. 4. This is arranged to occur when the blades 25 form a solid wall of the wing, as seen in Fig. 5. In this manner the blades are held from turning in one direction by the connecting rods 21 and in the opposite direction by the noses 32 which are held by abutments 30. The inner ends of the slides 27 each carries a link 33 pivoted thereon and to a sleeve 34 revolubly mounted around the shaft 11. The sleeve is also able to slide up and down on said shaft so that, when it is in its raised position, as seen in Fig. 7, the slides 27 will all be drawn inwardly toward the shaft while, when the sleeve is pushed downward, the slides 27 will be pushed outwards on their respective arms through the cooperation of the links 33 and the abutments 30 are pushed in the paths of the turning noses 32 of the caps 31 while, when the slides are drawn inwardly toward the shaft 11, the abutments are withdrawn from the paths of the noses 32, permitting free swinging of the blades.

In Fig. 1 is indicated an arrangement for raising and lowering the sleeve 34. The latter is provided with an annular groove 35 in which engages the studs 36 at the end of a bifurcated lever 37. The latter is fulcrumed, as at 38, in a bearing 39 secured in the top beam 14 of the structure and has an outwardly directed arm 40 on which is suspended an operating rod 41 of such a length that it may be comfortably reached from the ground. It is evident that with the lever 40 standing in the position indicated in full lines in Fig. 1, the sleeve 34 is raised to its uppermost position, thereby drawing the slides 27 together so that the blades 25 are unlocked and free to swing as far as the connecting rods 21 will permit. With the lever arm 40 lifted, as indicated in dotted lines in Fig. 1, the sleeve 34 is pushed down, thereby spreading out the slides 27 to lock the blades from turning.

For a large size wind motor, it is necessary to support the wings so as to relieve the shaft 11 from part of the weight. This is done by providing rollers 42 carried in suitable bearings on the under side and at the outer end of each of the bottom arms 20, see Fig. 1. A circular track 43 is provided for these rollers consisting of a rail secured on top of the beam 15. For smaller motors, however, no such track and rollers are necessary and the wings are in such a case supported entirely on the shaft 11.

The main shaft 11 is connected in the ordinary manner to a belt, chain or gear drive with the machinery to be operated, this, however, not being shown in the drawings as it forms no part of the present invention.

It is evident that in some cases it may be desirable to place the shaft 11 horizontally, which, however, does not in any manner change the general construction of the wings.

To start the wind motor, the lever arm 40 is pulled down, as shown in full lines in Fig. 1, setting the blades 25 free. With the wind blowing in the direction of the arrow X, as seen in Fig. 5, or against the plane of the drawing in Fig. 1, the wind will compel all the blades to close to form a complete wall, as indicated in the right-hand wing in Fig. 1. Simultaneously the wind blows in the same direction against the left wing in said figure or in the direction of the arrow Y in Fig. 5, when it opens the blades so that the wind may pass freely through the left wing. The full force of the wind will thus act on the right-hand wing and very little resistance will be given by the left-hand wing, while the third and the fourth wings extending in the plane of the direction of the wind will have their blades partly or substantially in said direction. In order to make the wings as effective as possible, the blades are not arranged in a straight radial line but placed along an arc, as seen in Fig. 5, so as to present a concave plane against the wind and thus collect as much as possible thereof against the blades. When the wings have revolved so that the one having the closed blades has turned ninety degrees, the blades of said wing will begin to open and simultaneously the following wing will have its blades closed and the wing ahead of the previously closed wing will have its blades swung away almost as far as possible from the corresponding connecting rods 21. There will accordingly be no resistance on the left side of the shaft 11, while the wall of blades has been formed or is being formed on the right-hand side thereof which will always resist the force of the wind.

It is, of course, very important that the motor is erected at some distance above the ground so that the wind can play freely thereupon from all directions. The turrets or masts 17 must accordingly be of sufficient height to carry the motor above surrounding buildings and trees. When a high, preferably flat topped building is available, the motor may be erected thereupon in which case the masts need only be of comparatively small height. The tracks 43 for the rollers 42 may then be laid directly on the roof or raised a couple of feet above. The upper bearing 12 for the shaft will, as before, be placed on a cross beam at the top of the structure, while the lower bearing may be placed on the roof. If the building contains an engine room and the shaft extends down into the same, a third bearing should be provided on the floor thereof. Suitable transmission connects the shaft with the machinery to be operated.

An object of the present invention is to provide cheap motive power for plants, such as pumping stations, in the irrigating districts or for light plants for villages in the rural districts to furnish the farmers with electric light as well as for operating the farming implements.

For very high powered motors, the number of wings would be multiplied and the wings lengthened and more blades added. Short wings may also be inserted between the main wings braced between the latter near the outer periphery. Several motor units may also be installed for each plant.

Having thus described the invention, I claim:

1. In a wind motor, a vertical shaft, upper and lower arms secured to and projecting radially from the shaft, a series of blades pivotally mounted in and between the arms, connecting bars disposed vertically between the arms and having their ends rigidly secured to the arms, the bars being disposed in the paths of the free edge portions of the blades to limit the closing movement of the blades, lateral projections on the pivots of the blades adjacent one of the arms, stops slidably mounted on the arm to engage said projections and restrain opening movement of the blades, and means for operating the stops.

2. In a wind motor, a vertical shaft, upper and lower arms secured to and projecting laterally from the shaft, a series of connecting bars secured rigidly to and extending between the arms, a plurality of pivots mounted in and between the arms and extending beyond one of the arms, blades secured to the pivots and having their free edge portions arranged to abut the connecting bars, lateral projections on the extended ends of the pivots, a slide mounted on the adjacent arm between the same and the projections on the pivots, said slide having longitudinal slots receiving the extended ends of the pivots, stops on the slide to be engaged by the respectively adjacent projections, and means for operating the slide.

In testimony whereof I affix my signature.

PER W. PALM. [L. S.]